United States Patent Office.

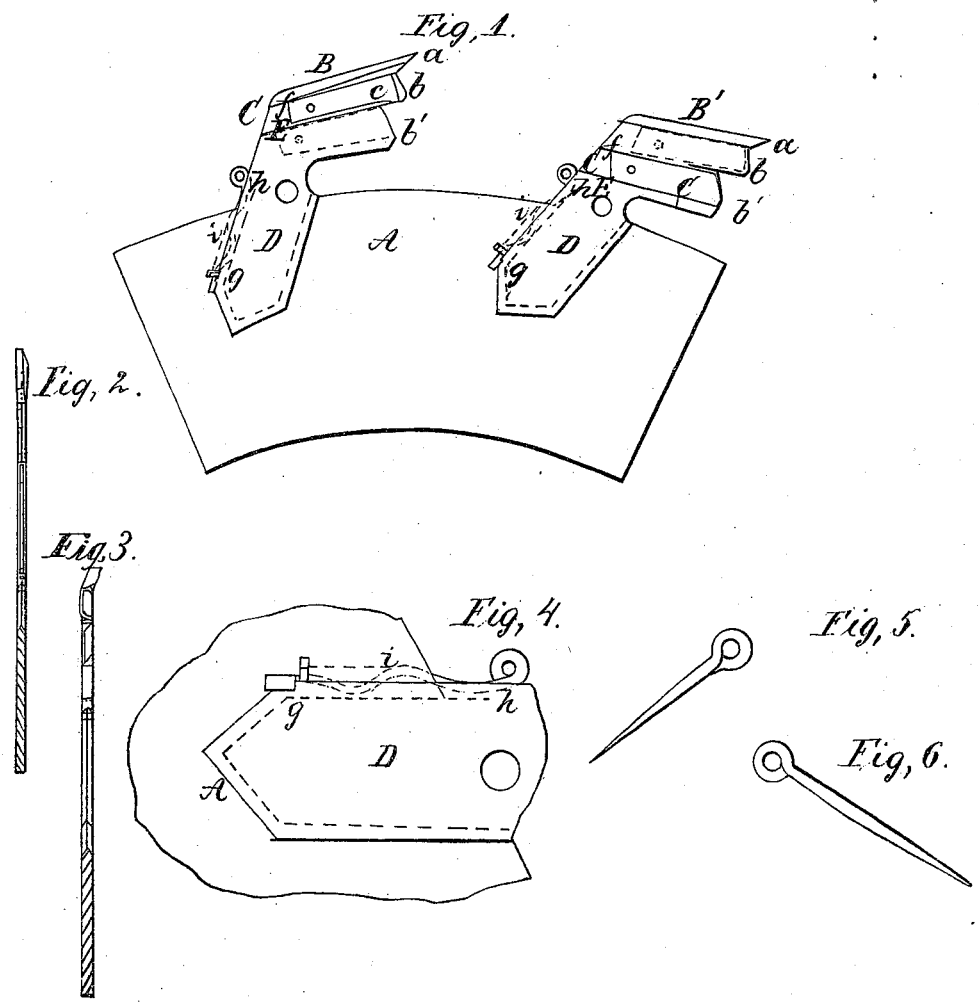

IRA S. BROWN AND CHARLES N. BROWN, OF PROVIDENCE, RHODE ISLAND, ASSIGNORS TO THEMSELVES AND J. MASON GROSS, OF SAME PLACE.

Letters Patent No. 96,305, dated November 2, 1869.

IMPROVEMENT IN SAWS.

The Schedule referred to in these Letters Patent and making part of the same

*To all whom it may concern:*

Be it known that we, IRA S. BROWN and CHARLES N. BROWN, both of the city and county of Providence, in the State of Rhode Island, have invented certain new and useful Improvements in Saw-Teeth; and we do hereby declare that the following specification, taken in connection with the drawings, making a part of the same, is a full, clear, and exact description thereof.

Figure 1 is a side view of a section of the plate and of two of the teeth.

Figures 2 and 3 are views of the back and front sides of the teeth respectively.

Figure 4 is a view of the shank of the tooth and the holding-key enlarged.

Our invention has reference to that class of saw-teeth which is made separately from the plate, but which can be inserted therein and secured thereto, or be disengaged therefrom at pleasure. Instances of this class are shown and described in the several Letters Patent granted to us, October 24, 1865, March 12, 1867, and January 29, 1867.

The saw-tooth herein shown is both a cutting and a planing-tooth; that is to say, it not only cuts its kerf, but planes the lumber upon each side thereof.

The particular improvement herein claimed resides in the application, to the cutting-edges which perform the planing-operation, of "back-irons," performing the same useful functions as the same devices in the well-known joiners' plane.

In the drawings—

A represents a section of a saw-plate, and

B B' are two of the teeth of the saw.

Each tooth is a combined sawing and planing-tooth made up of a cutting-point or edge, $a$, and in this instance, by preference, of two planing-edges or tools, $b\ b'$, for each tooth set to cut upon both sides of the kerf.

Every alternate tooth in the series has its planing-edges set so as to cut upon opposite sides of the kerf from those upon which the planing-edges of the preceding tooth, corresponding in position, cut. Thus, in the two teeth shown in fig. 1, the upper planing-tool $b$, of the tooth B, cuts in the opposite side of the kerf from that upon which the corresponding planing-tool $b$ of the tooth B' cuts; and this arrangement should be employed, whatever may be the number of planing-tools appropriated to each tooth in order to balance the saw and prevent it from springing.

It will be seen that each of the planing-tools $b\ b'$ is furnished with a back-iron, $c$, whereby, as in the ordinary carpenters' plane, the thickness of the shaving is gauged, and the edge of the plane-iron prevented from making a "rank" cut.

A convenient way of securing the back-iron in place will be to make it slightly tapering toward its rear end, and adapt it to wedge itself firmly in the dove-tailed edges of the channel C, which may be cut in the side of the tooth, as shown.

The teeth employed in this instance are furnished with shanks, D, of any preferred form, which are fitted to be inserted in the saw-plate, the edge of the space in the plate to be fitted by such shank being made of V-form, and a corresponding channel, fitting such V-formed edge, being made in the edges of the shank.

Upon the side of the saw-plate, from $g$ to $h$, and also upon the side of the shank contiguous thereto, a flat-bottomed channel is cut, into which a key, $i$, of any preferred form, may be inserted for holding fast the tooth, as is well understood.

What we claim as our invention, and desire to secure by Letters Patent, is—

The employment or use, in combination with a saw-plate, A, of one or more teeth, B B', whose planing-edges are furnished with back-irons, $c$, substantially as described, for the purposes specified.

IRA S. BROWN.
CHAS. N. BROWN.

Witnesses:
WM. W. RICKARD,
CHAS. L. PENDLETON.